US006181255B1

(12) United States Patent
Crimmins et al.

(10) Patent No.: US 6,181,255 B1
(45) Date of Patent: Jan. 30, 2001

(54) MULTI-FREQUENCY RADIO FREQUENCY TRANSMITTER WITH CODE LEARNING CAPABILITY

(75) Inventors: Terence E. Crimmins, Northport, NY (US); Bradford L. Farris; Paul E. Wanis, both of Chicago, IL (US)

(73) Assignee: The Chamberlain Group, Inc., Elmhurst, IL (US)

( * ) Notice: Under 35 U.S.C. 154(b), the term of this patent shall be extended for 0 days.

(21) Appl. No.: 08/907,676

(22) Filed: Aug. 8, 1997

Related U.S. Application Data

(63) Continuation-in-part of application No. 08/807,651, filed on Feb. 27, 1997, now abandoned.

(51) Int. Cl.[7] ...................................................... H04Q 7/02

(52) U.S. Cl. ............................... 340/825.69; 340/825.72; 340/825.31; 341/176

(58) Field of Search ......................... 340/875.69, 825.72, 340/825.22, 825.31, 825.71, 825.57, 539, 525; 341/176; 455/352, 85, 151.2; 348/734

(56) References Cited

U.S. PATENT DOCUMENTS

| | | | |
|---|---|---|---|
| 3,911,397 | 10/1975 | Freeny, Jr. . | |
| 4,081,747 | 3/1978 | Meyerle . | |
| 4,130,738 | 12/1978 | Sandstedt . | |
| 4,263,536 | 4/1981 | Lee et al. | 318/266 |
| 4,322,855 | 3/1982 | Mogi et al. | 455/151 |
| 4,328,540 | 5/1982 | Matsuoka et al. . | |
| 4,422,071 | 12/1983 | de Graaf | 340/825.44 |
| 4,529,980 | 7/1985 | Liotine et al. | 340/825.52 |
| 4,535,333 | 8/1985 | Twardowski | 340/825.69 |
| 4,581,606 | 4/1986 | Mallory | 340/539 |
| 4,596,985 | 6/1986 | Bongard et al. | 340/825.69 |
| 4,623,887 | 11/1986 | Welles, II | 340/825.57 |
| 4,626,848 | 12/1986 | Ehlers | 340/825.69 |
| 4,652,860 * | 3/1987 | Weishaupt et al. | 340/539 |
| 4,750,118 | 6/1988 | Heitschel et al. . | |
| 4,825,200 | 4/1989 | Evans et al. | 341/23 |
| 4,905,279 | 2/1990 | Nishio | 380/9 |
| 4,912,463 | 3/1990 | Li | 340/825.69 |
| 4,988,992 | 1/1991 | Heitschel et al. | 340/825.69 |
| 4,999,622 | 3/1991 | Amano et al. | 340/825.72 |
| 5,028,919 | 7/1991 | Hidaka | 340/825.72 |
| 5,081,534 | 1/1992 | Geiger et al. | 358/194.1 |

(List continued on next page.)

FOREIGN PATENT DOCUMENTS

WO 94/02920 * 2/1994 (WO) ............................. 340/825.69

*Primary Examiner*—Edwin C. Holloway, III
(74) *Attorney, Agent, or Firm*—Fitch, Even, Tabin & Flannery

(57) ABSTRACT

A radio frequency transmitter for use in generating coded commands learned from received coded radio frequency signals. An transceiver circuit including a switching element and a tunable filter tuning element is coupled to a programmable controller, e.g, a microprocessor. The programmable controller operates the switching element of said transceiver circuit in either a first or a second mode for receiving or transmitting coded radio frequency signals, respectively via an antenna coupled to the tuning element. The switching element is operable in the first mode to demodulate received coded radio frequency signals, and the programmable controller learns the received coded radio frequency signals and stores coded commands in memory. In the second mode of operation, an oscillator is modulated by generated coded signals from the programmable controller using the stored coded commands from memory. The generation of plural coded radio frequency commands with the single radio frequency transmitter unit facilitates the learning, responsive to a received radio frequency signal, of an additional coded radio frequency command for additional door and gate operators.

20 Claims, 14 Drawing Sheets

U.S. PATENT DOCUMENTS

| | | | | |
|---|---|---|---|---|
| 5,142,398 | | 8/1992 | Heep | 359/148 |
| 5,319,802 | * | 6/1994 | Camiade et al. | 455/85 |
| 5,379,453 | | 1/1995 | Tigwell | 455/151.2 |
| 5,442,340 | | 8/1995 | Dykema | 340/825.22 |
| 5,471,668 | | 11/1995 | Soenen et al. | 455/352 |
| 5,475,366 | * | 12/1995 | Van Lente et al. | 340/525 |
| 5,479,155 | | 12/1995 | Zeinstra et al. | 340/825.22 |
| 5,564,101 | * | 10/1996 | Eisfeld et al. | 455/352 |
| 5,621,756 | | 4/1997 | Bush et al. | 375/219 |
| 5,661,804 | * | 8/1997 | Dykema et al. | 380/21 |

* cited by examiner

MULTI-FREQUENCY RADIO FREQUENCY TRANSMITTER WITH CODE LEARNING CAPABILITY

CROSS-REFERENCES TO RELATED APPLICATIONS

This application is a continuation-in-part of U.S. patent application Ser. No. 08/807,651, filed Feb. 27, 1997 now abandoned.

BACKGROUND OF THE INVENTION

The invention relates in general to radio frequency transmitters and, in particular, to code learning capabilities for a radio frequency transmitter.

Presently, garage doors and barrier gates both commonly employ operators which may be remotely controlled from hand-held radio frequency (RF) transmitters. Over the years, there have been a variety of code formats used for RF control of such gates and garage doors. Many of the commonly used code formats employ a fixed code format that may be set with DIP switches, non-volatile memory devices, or the like. More recently, rolling codes have become the industry standard in certain applications, e.g., automobile locks, individual garage door operators, etc. An example of a rolling code generating transmitter of the type described herein is disclosed in U.S. patent application Ser. No. 446,886, filed May 17, 1995, by Farris et al. for "Rolling Code Security System," assigned to Applicants' assignee.

In gated applications, however, fixed code RF transmitters are still preferred because while a single or a few number of users may operate a given garage door or automobile, typically it is intended that many users be allowed to operate barrier gates. In such gated applications therefore, the DIP coded (or fixed code) RF transmitters are preferred because additional transmitters may be programmed simply by matching the fixed command code, e.g. 10 or 20 word codes, or the DIP switches with that of other RF transmitters programmed for operating the gate. Simply matching the command codes to program other rolling code RF transmitters however also requires additional receiver memory in order to add valid rolling code RF transmitters. Examples of code generating transmitters of the type described herein for generating 10 and 20 word fixed code formats are disclosed in U.S. Pat. No. 5,576,701 to Heitschel et al. for "Remote Actuating Apparatus Comprising Keypad Controlled Transmitter," issued Nov. 19, 1996.

The differing hardware and software requirements of the fixed command code transmitters and the rolling command code transmitters, with each having respective advantages, has created problems in providing RF transmitters supporting integrated (multiple) coding schemes for multiple operators wherein the user may want a rolling code transmitter to operate, e.g., the garage door, but a fixed code transmitter to operate, e.g., the barrier gate. It is advantageous to provide a single transmitter unit to each of multiple users having general access to a common barrier gate, and access to a single or specified garage doors or the like beyond the barrier gate. However, such integrated transmitter units for handling multiple codes are complex and a number of problems are encountered in their implementation.

Additionally there are a variety of problems associated with DIP switches, in that they are relatively large, costly, unreliable and users can inadvertently change the fixed command code. Moreover, codes set with DIP switches are visible and can be easily misappropriated or copied to a like transmitter.

What is needed then is a hand-held radio frequency transmitter for generating plural code formats, including code learning capabilities used in the transmission of a fixed code, e.g., for a gate operator, wherein the transmitter also generates pre-programmed codes, e.g., a rolling code format for operating a garage door. Further, it is desirable to provide for the learning of various fixed code formats, e.g., 10 and 20 words, through the use of electrical programming of memory, rather than with the physical setting of DIP switches. Therefore, it would be advantageous to have the hand-held radio frequency transmitter unit capable of generating plural coded radio frequency commands and being programmable responsive to a received radio frequency signal for learning an additional coded radio frequency command corresponding to the received radio frequency signal when a signal is received from a like RF transmitter sending its RF coded signal within the immediate vicinity.

The various manufacturers of code responsive devices use commands transmitted at different RF frequencies. It is desirable not only to learn codes which are received at these various frequencies but to be able to transmit those codes at the received frequencies. Heretofore, complex systems using frequency synthesized oscillator circuitry for reception and transmission of codes have been proposed. These systems are very complicated and costly and what is needed is a system which learns and transmits coded signals at multiple frequencies without the cost and complexity of prior systems.

SUMMARY OF THE INVENTION

It is an object of the present invention to provide a hand-held radio frequency transmitter that overcomes the disadvantages and problems of the prior art.

It is an object of the invention to provide a hand-held radio frequency transmitter unit for generating coded commands learned from received coded radio frequency signals.

It is another object of the invention to provide a hand-held radio frequency transmitter unit capable of generating plural coded radio frequency commands and being programmable responsive to a received radio frequency signal for learning an additional coded radio frequency command corresponding to the received radio frequency signal.

It is further object of the invention to provide a method of generating plural coded radio frequency commands with a hand-held radio frequency transmitter unit capable of learning, responsive to a received radio frequency signal, an additional coded radio frequency command corresponding to the received radio frequency signal.

Briefly summarized, the present invention relates to a hand-held radio frequency transmitter for use in generating coded commands learned from received coded radio frequency signals. An oscillator circuit including a switching element and a tunable filter tuning element is coupled to a programmable controller. The programmable controller operates the switching element of said oscillator circuit in either a first or a second mode for receiving or transmitting coded radio frequency signals, respectively via an antenna coupled to the tuning element. The switching element is operable in the first mode to detect demodulate and receive coded radio frequency signals, and the programmable controller learns the received coded radio frequency signals and stores coded commands in memory. In the second mode of operation, the oscillator is modulated by generated coded signals from the programmable controller using the stored coded commands from memory. The generation of plural coded radio frequency commands with the single hand-held radio frequency transmitter unit capable of handling multiple codes facilitates the learning, responsive to a received radio frequency signal, of an additional coded radio frequency command for additional door and gate operators.

The trainable transceiver of the present invention can be used to receive and transmit coded signals at multiple frequencies.

An embodiment of the present invention relates to a trainable transceiver for the reception and programming of the differing code formats for several types of commercially-manufactured radio frequency code transmitters. This embodiment includes a plurality of output stage transmitters, each being tuned to an output frequency of one or more compatible manufactured systems. The trainable transceiver is provided with a learn mode, allowing the receiver to duplicate a target transmitter by the number of different manufacture types for transmitting at fixed code formats. Codes to be learned are received by a receiver of the learning transmitter and are decoded to identify the code of the received signal. The type, e.g., manufacturer, of received signal is also identified by the timing and sequencing of the received code. Once the type of received code is known, the frequency of that type is determined from stored data. The identity of the frequency is then stored in association with the received code for later use at transmission. When a learned code is to be transmitted, the code and the data identifying the type of code and frequency are read and the proper frequency transmitter is selected and used for transmission. Advantageously, receivers may be coupled to one Or more of the transmitters which are polled to find a strong incoming signal. Also disclosed with the embodiment is a user interactive method of identifying and recording the proper frequency when the stored data cannot exactly provide the identity of a frequency for transmission.

Other objects and advantages of the present invention will become apparent to one of ordinary skill in the art, upon a perusal of the following specification and claims in light of the accompanying drawings.

BRIEF DESCRIPTION OF THE DRAWINGS

FIG. 7A represents a "0" bit, FIG. 7B represents a "1" bit, FIG. 7C represents a synchronization period, and illustrates an example code frame;

FIG. 8A illustrates the trinary bit pattern generally, FIG. 8B represents a "0" bit, FIG. 8C represents a "1" bit, FIG. 8D represents a "2" bit, FIG. 8E representing a 10 bit frame, synchronization and blank periods, and FIG. 8F represents the additional frame for 20 bits codes; FIG. 9A represents a "0" bit, FIG. 9B represents a "1" bit, FIG. 9C represents a synchronization period, and FIG. 9D illustrates an example code frame.

DETAILED DESCRIPTION OF THE PREFERRED EMBODIMENTS

Figure 1:
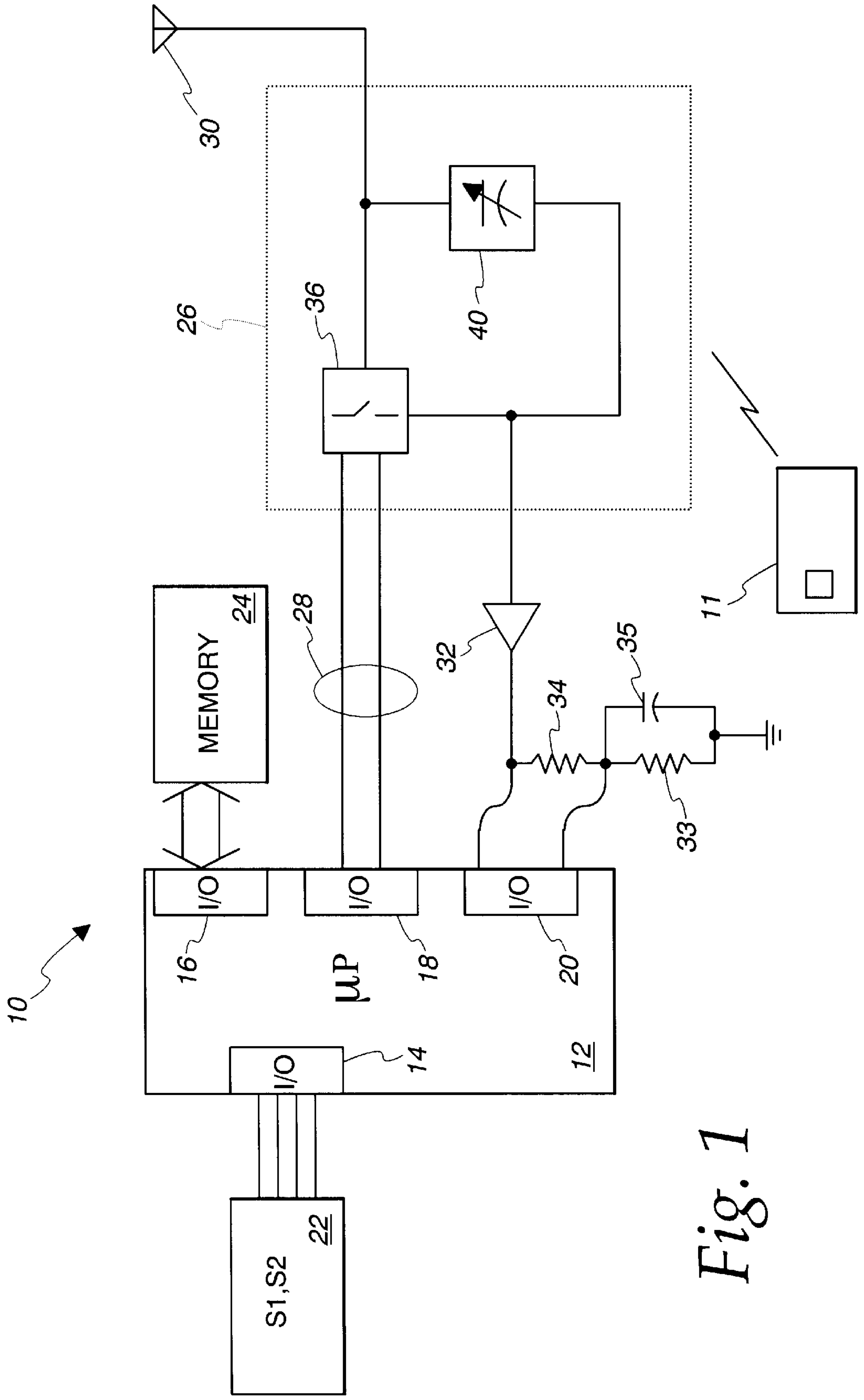
FIG. 1 is a block diagram of a hand-held radio frequency transmitter 10 in accordance with the present invention.

Referring now the drawings and especially to FIG. 1, a hand-held radio frequency transmitter embodying the present invention is generally shown therein and is identified by numeral 10. The transmitter 10 includes a programmable controller, e.g., a microcontroller herein Zilog Z86CO8 or microprocessor ($\mu$P) 12 which has multiple input/output ports (I/O) 14, 16, 18 and 20. A plurality of switches, respectively numbered S1 and S2 are connected in parallel to ground and to input to the microprocessor 12 via port 14. A non-volatile memory 24 is connected to microprocessor 12 via port 16.

The memory 24 is may be any semiconductor memory device or data register, herein a serial memory device, a standard EEPROM 93C46, employed (see FIG. 2) but either a serial or parallel coupled non-volatile memory of any known variety may be used. In the past, the code was set in the transmitter by means of DIP switches or was permanently stored in the receiver in ROM at the time of manufacture. In order to maintain consistency, many receivers made today can respond to either 10 or 20 word fixed code formats, at the user's choice. The memory 24 facilitates storage of a variety of code formats.

An oscillator circuit 26 (indicated by the dashed box of FIG. 1) includes three interconnected elements, a switching element 36 and a tunable filter tuning element 40. The switching element 36 is coupled to the microprocessor 12 via control lines 28 to port 18. The switching element 36 and the tuning element 40 are coupled to an amplifier 32 which is used to develop a demodulated potential across a resistance 34 with resistor 33 and capacitor 35 providing a path to ground coupled to the microprocessor 12 for receiving a signal via port 20, which acts as an average detector or low pass filter (LPF) to improve the noise margin at the comparator inputs, herein input port 20 of microprocessor 12. The switching element 36 and the tuning element 40 are coupled to an antenna 30. The switching element 36 of the oscillator circuit 26 operates in one of first or second modes for receiving or transmitting coded radio frequency signals, respectively via the antenna 30. The amplifier 32 is coupled to the switching element 36 and operates in the first mode with the switching element 36 which demodulates received coded radio frequency signals. The microprocessor 12 is thus programmed to learn the received coded radio frequency signals, and then the microprocessor 12 stores such coded commands in the memory 24. In the second mode of operation, the oscillator circuit 26 is modulated by generated coded signals from the microprocessor 12 using the stored coded commands retrieved from the memory 24. The microprocessor 12 thus causes the oscillator 26 to generate modulated radio frequency energy which is emitted by an antenna 30 and which may be received by a garage door operator or other device to be operated.

Figure 2:
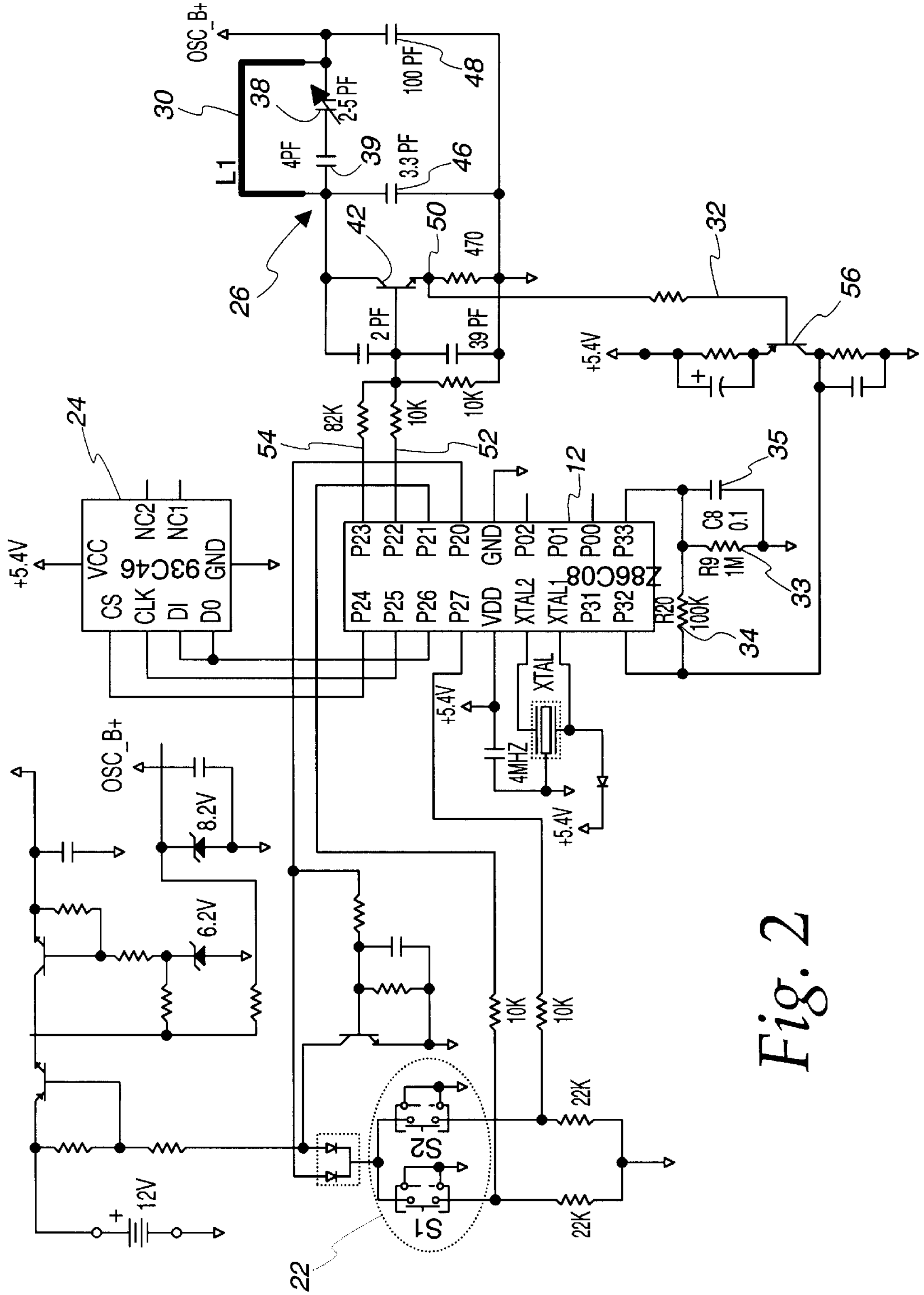
FIG. 2 is a schematic diagram of the hand-held radio frequency transmitter 10 embodying the invention.

The code-learning transmitter 10 is shown in the schematic diagram of FIG. 2. The microprocessor 12 is a powered by a regulated 5.4 volt source which is regulated from a battery or power supply. The microprocessor 12 has a 4 Mhz crystal clock generator and includes I/O port 0, port 2, port 3. The memory 24 is shown as using pins of port 2 for control signals, chip select and clock, and data input and output is provided via port 2 to serial non-volatile memory.

When a new code is to be learned, e.g., switches S1 and S2 are depressed simultaneously to enter the learn mode.

The microprocessor 12 detects entry of the learn mode and provides a low level bias to transistor 42 for some gain and then awaits a received code between its pins P33 and P32, to read the signal detected across the 100 Kilohm resistor 34. The low level bias from microprocessor 12 causes the switching element 36 of the oscillator circuit 26 to operate in its first mode for receiving and detecting coded radio frequency signals via the antenna 30. Radio frequency signals received by antenna 30 while transmitter 10 is in the learn mode are detected (demodulated) by the switching element 36 as received coded signals which are then amplified at amplifier 34 before they are read by microprocessor 12. It should be appreciated that other methods of specifying the learn mode also may be employed, e.g., a separate dedicated learn mode switch may be provided on the transmitter unit 10 for use by the user when a new code is to be learned.

Another transmitter called a source transmitter 11 is preferably the source of radio frequency signals providing a security code to be learned. Transmitter 11 can transmit either a 10 or 20 word fixed code which will be received by the antenna 30 and be coupled for signal detection with the transistor 42 of the switching element 36. FIG. 1 depicts the source transmitter 11 in an enclosure for housing its circuitry. The source transmitter 11 may be of same or similar software and hardware design as that discussed herein in connection with the transmitter unit 10; alternatively, the source transmitter 11 may be provided as a programming transmitter unit specifically used for programming such learning transmitters.

The base of a biased transistor 56 is connected to the oscillator circuit at a point 50 which imposes a minimal loading of the transmitter oscillator circuit 26. The outputs of this amplifying transistor 56 are applied to the microprocessor inputs P33 and P32 via resistor 34. The microprocessor identifies from the timing of the received signal whether a 10 or 20 word code was received and adds the newly received 10 or 20 word code to the memory 24 which may store multiple codes; alternatively, a previously received code may simply be replaced with the newly received code if desired. Advantageously, the receiver stage will may be designed for low sensitivity to receive RF codes transmitted within only about 6" from the learning transmitter, for security reasons.

The digital code, either 10 or 20 word fixed code, is stored in the memory 24 and used for transmission of the coded RF signal in the second mode wherein the microprocessor 12 biases transistor 42 is used to modulate the oscillator circuit 26 for transmitting the digital code. The microprocessor 12 is enabled by depressing a button, e.g., S2, to send a digital representation of the code on the lead output to transistor 42. The microprocessor 12 biases transistor 42 on, and transistor 42, i.e. forming part of the switching element 36 of the oscillator circuit 26 enables the transmission the RF signal representation of the digital code via the antenna 30, herein a printed circuit board (PCB) loop antenna. The RF signals transmitted from the antenna 30 are at approximately 390 Mhz, as generated using the described oscillator circuit 26.

The tuning element 40 includes capacitors 38, 39, 46 and 48 which are tuned as shown in FIG. 2. As discussed above, node 50 between the switching element and the tuning element 40 provides a convenient point for coupling the amplifier 32 to the switching element 36 and tuning element 40 because there is a minimal affect on the performance of the oscillator circuit. The amplifier 32 includes a biased transistor 56 to amplify the signal from reference point 50. The base of transistor 56 provides a high, impedance front end input to the amplifier 32 which will not significantly impact the operation of the oscillator circuit 26. Thus, the tuning element 40 is employed both for receiving and transmitting signals via the antenna 30.

Resistors 52 and 54, 30 Kilohms and 82 Kilohms respectively, are coupled to the base of transistor 42 from two separate outputs of port 2 of the microprocessor 12. Accordingly, driving either or both of resistors 52 or 54 with the output port of the microprocessor 12 dictates the extent to which transistor 42 is biased on. For instance, driving resistor 52 switches the transistor 42 into its "on" state with about 2.5 volts at the base of transistor 42; driving resistor 54, on the other hand, only provides a low level bias, e.g., about 1 volt at the base of transistor 42, for some gain in a non-linear mode of operation coupling the transistor 56 of amplifier 32 to the antenna 30 for operating in the above-described first mode of operation of the switching element as a signal detecting or demodulating element. The aforementioned turning on of transistor 42 driving resistor 52 facilitates the second mode of operation of the switching element for transmitting a modulated RF coded signal.

Figure 3:
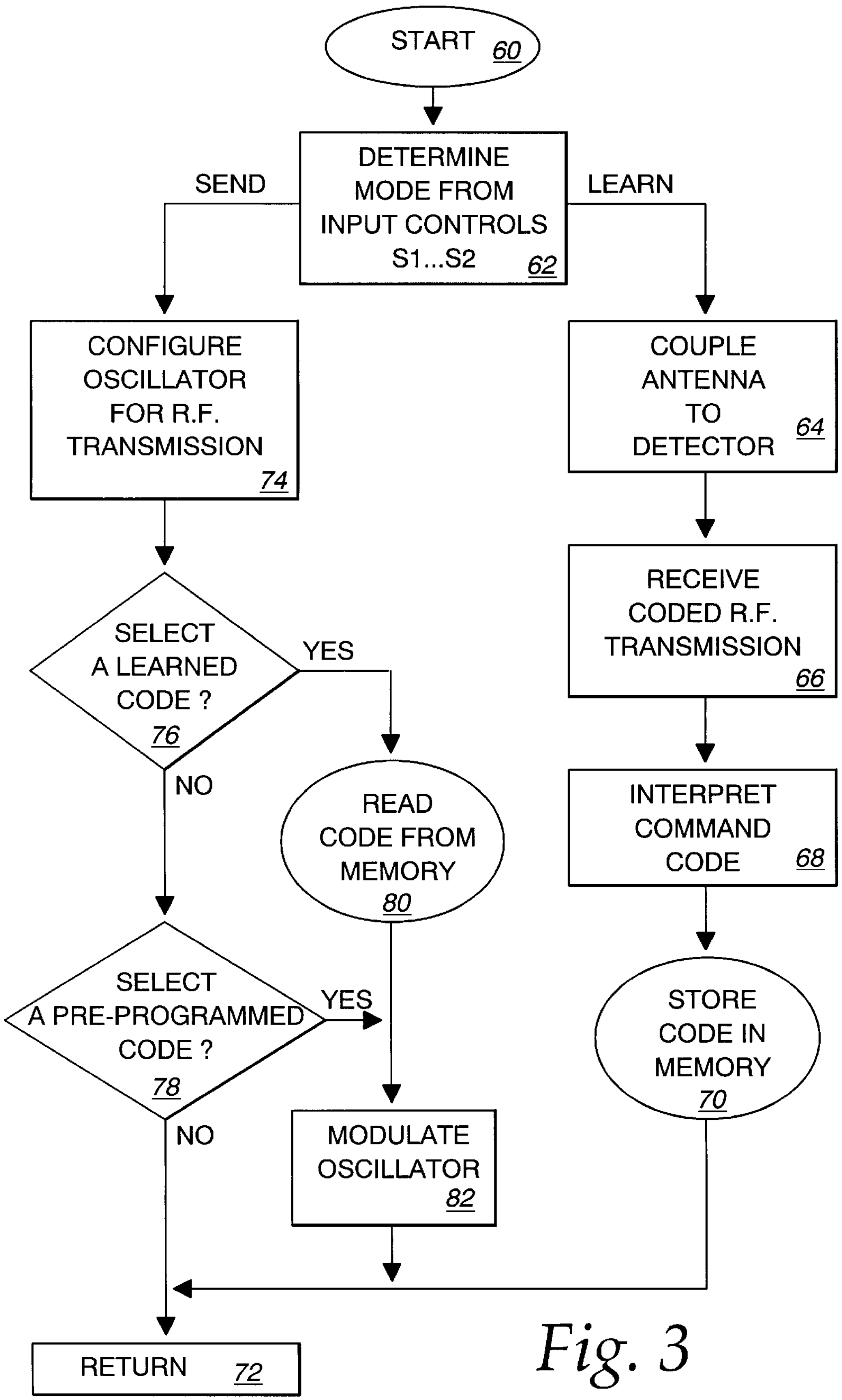
FIGS. 3 and 4A, 4B and 4C are program flow charts showing operations for the microprocessor 12 of the radio frequency transmitter 10 shown in FIGS. 1 and 2.

Turning now to FIG. 3, the program flowchart showing operations for the microprocessor 12 of the radio frequency transmitter 10 further describes the first and second modes of operation, learn and send respectively. Program flow starts at start block 60 and proceeds to block 62 where a determination is made as to whether to place the transmitter 10 into its learn mode or send mode from reading input controls S1 and/or S2. In the learn mode, program flow proceeds to block 64 wherein switching element 36 is biased in its first mode of operation, as discussed above, to couple the antenna 30 to the detector 32. At block 66, an RF coded transmission is received via the antenna 30. The microprocessor 12 then interprets the command code at block 68 from the received coded RF transmission to learn the command code which was received, e.g., from another transmitter unit. At step 70, the microprocessor stores the code in the memory 24 and a return from the program is executed at block 72.

When block 62 determines from the input controls that the transmitter unit is in its "send" mode of operation, program flow continues to block 74 wherein the switching element 36 is biased in its second mode of operation to configure the oscillator circuit 26 for RF transmission. At block 76, the microprocessor 12 determines whether a learn code should be selected for transmission, if so, block 80 is used to read the code from the memory 24. Otherwise, at block 78 a determination is made whether to select a pre-programmed code, e.g., a rolling code or the like, for transmission from the RF transmitter 10. Then block 82 allows the microprocessor 12 to modulate the oscillator circuit 26 to provide radio frequency transmission of the generated coded signal at antenna 30.

Figure 4A:
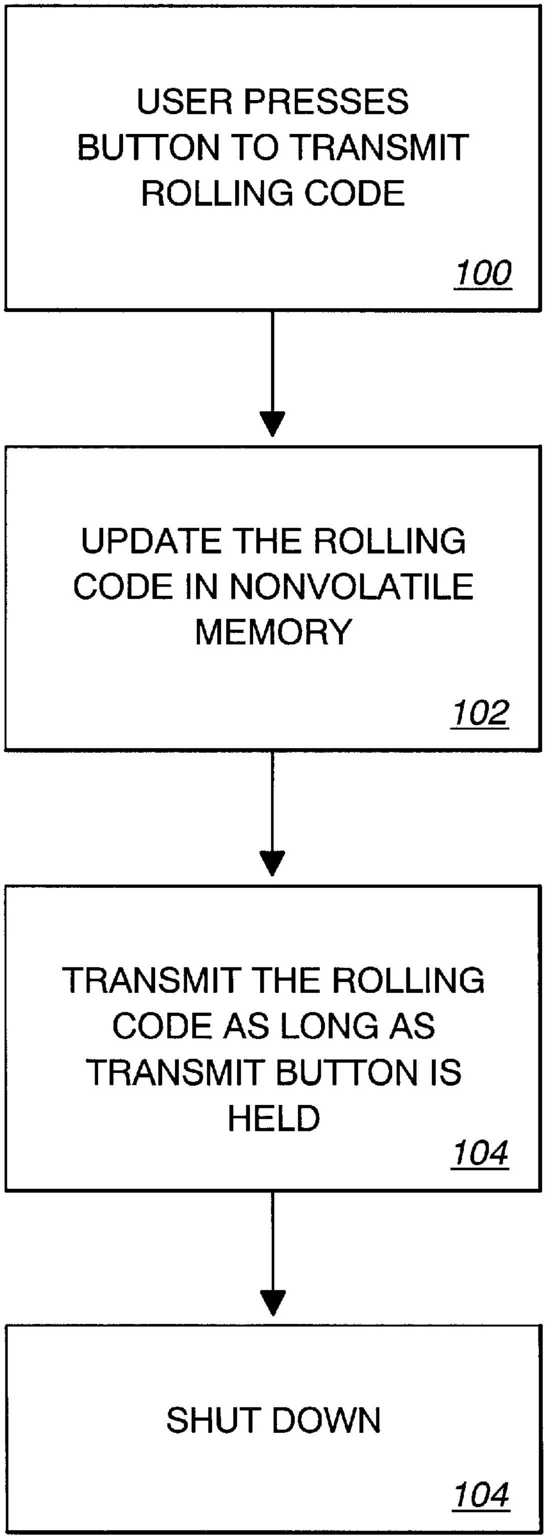
Figure 4B:
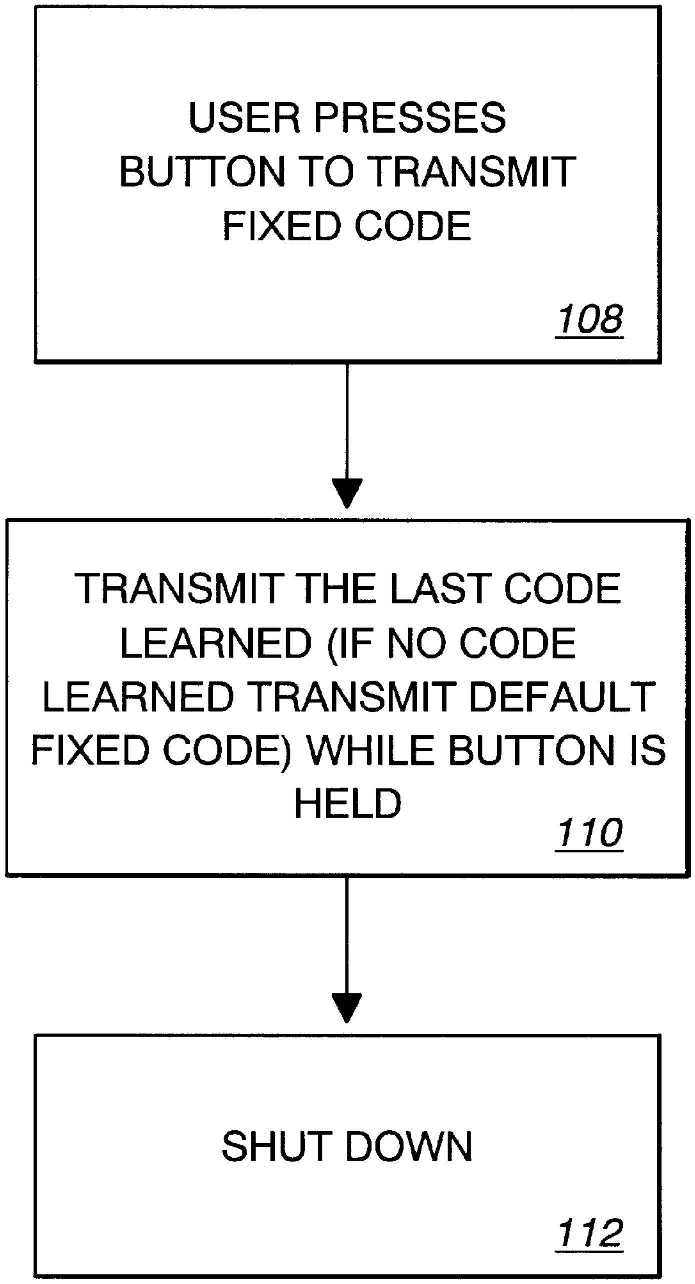
Figure 4C:
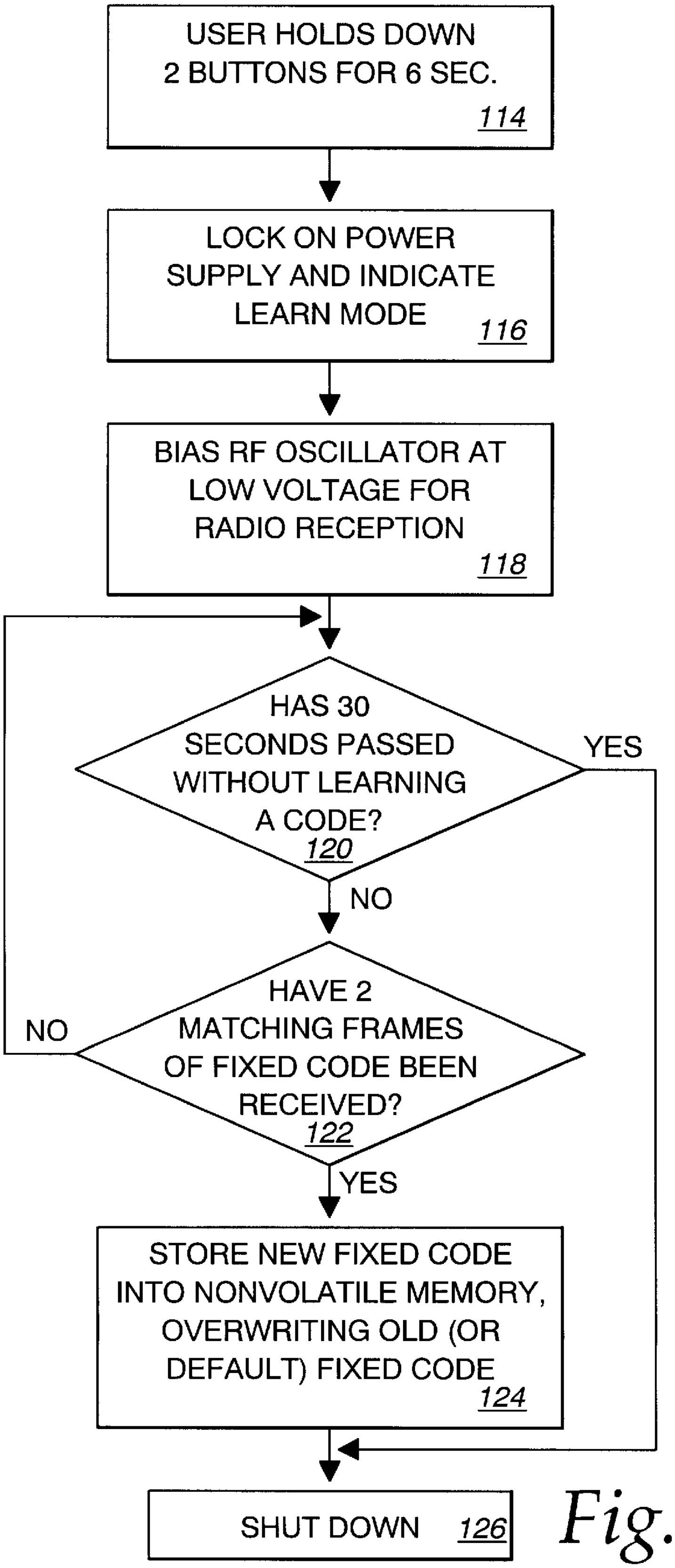

Turning now to FIGS. 4A, 4B and 4C, the user presses, e.g., one of S1 or S2 to transmit a rolling code at step 100, upon which the update to the rolling code is provided in a non-volatile memory for the rolling code transmission via microprocessor 12 at block 102. Accordingly, the transmitter 10 transmits the rolling code as long as the transmit button is held active at step 104 and the transmitter 10 shuts down at step 106. Alternatively, for a fixed code transmission, the user presses the button, e.g., S1 or S2 to transmit a fixed code at block 108 in FIG. 4B. The transmitter 10 then transmits the last code learned, if no code learned transmit default fixed code is provided, at block 110. The transmitter 10 will, of course, transmit the fixed code as long as the button for the fixed code is held active, after which the transmitter 10 is shut down at block 112. Thus, the transmitter 10 provides either for the transmission of a pre-programmed code, e.g., rolling code format or alternatively, a fixed code format which may be learned as discussed above.

FIG. 4C is a program flow chart further describing programming of the transmitter 10. Herein, the user holds down two (2) buttons S1 and S2 for approximately six seconds, e.g., S1 and S2 at block 114. Then, a lock on the power supply rails indicates that the learned mode at block 116. At block 118, the oscillator 26, and particularly the switching element 36, i.e., transistor 42, is biased at a low voltage for radio reception. A 30-second time out is provided for the learn mode at block 120 during which two (2) matching frames of fixed code transmissions are expected to be received by the transmitter 10 in its learn mode at block 122. Two consecutive reads of the fixed code ensures proper decoding and reduces the likelihood of false reads. If the 30-second time out is passed without a learned code or if two matching frames of fixed code have not been received, then program flow proceeds from block 120 to shut down the transmitter 10 at block 126. If, however, two matching frames of fixed code have been received at block 122, then at block 124 the new fixed code is stored into non-volatile memory 24 overriding the old or default fixed code, or in the alternative, adding the new fixed code to the memory 24 which may maintain a limited number of fixed codes as discussed above. After the new fixed code is added to memory 24 at block 124 then a program flow proceeds to block 126 wherein the transmitter 10 is shut down.

There has been described a hand-held radio frequency transmitter unit 10 for generating coded commands learned from received coded radio frequency signals. The described oscillator circuitry 26 includes switching 36 and tuning elements 40. The programmable controller 12 is coupled to the switching element 36 of the oscillator circuitry 26. The antenna 30 is then coupled to the tuning element 40 of the oscillator circuitry 26. The amplifier 32 is coupled to the switching element 36 such that the switching element 36 being operable in its first mode of operation couples the antenna 30 for detecting and demodulating received coded radio frequency signals from the antenna 30. The memory 24 connected to the programmable controller 12 facilitates the programmable controller 12 being responsive to the demodulated received coded signals from the detector 32 for learning the received coded radio frequency signals and for storing coded commands in the memory 24. The switching element 36 has also been described as being operable in its second mode of operation for modulating operation of the oscillator 26 output to cause the oscillator to be modulated by generated coded signals from the programmable controller 12 using the stored coded commands from the memory 24. Thus, the antenna is operable with the tuning element of the oscillator circuitry 26 for radio frequency transmission of the generated coded signals, when in the second mode of operation of the switching element 36.

The described hand-held radio frequency transmitter unit 10 facilitates the received coded radio frequency signals to be demodulated including radio frequency signals modulated by generated coded commands from another of the transmitter units 10, either an identical hand-held radio frequency transmitter unit 10 or a special purpose programming unit. The coded signals from the programmable controller 12 include the fixed code format using the stored coded commands from the memory 24. The switching element 36, operable in the second mode of operation for generating coded signals from the programmable controller 12 using stored coded commands from the memory 24, is further operable for modulating the operation of the oscillator 26 to cause the oscillator 26 to be modulated by additional coded radio frequency signals from the programmable controller 12. Such additional coded radio frequency commands from the programmable controller 12 include coded signals employing the rolling code format, as well.

The hand-held radio frequency transmitter unit 10 has also been described as being capable of generating plural coded radio frequency commands and being programmable responsive to the received radio frequency signal for learning the additional coded radio frequency command corresponding to the received radio frequency signal. The transmitter unit 10 typically being provided as housed in an enclosure, includes input controls, i.e., S1 . . . S2, ref. 22, mounted upon the enclosure for user selection of at least one of the pre-programmed commands or the additional commands for transmission from the transmitter unit 10. Responsive to the user controls, the programmable controller 12 causes the oscillator 26 to be modulated by generated pre-programmed commands or additional commands from the programmable controller 12 using the stored additional coded commands from the memory 24 for generating the additional commands. The pre-programmed coded commands from the programmable controller 12 have been described as including the rolling code format. The additional coded commands from the programmable controller 12 have been described as using the fixed code format. The programmable controller 12 includes input ports such that the input controls include the plurality of user selectable buttons, i.e., S1 . . . S2, ref. 22, coupled to the input port for initiating the learn mode, the programmable controller 12 being responsive to the demodulated received coded signals during the learn mode for storing the received coded radio frequency signals as the additional coded commands in the memory 24 as the fixed code format command.

The method of generating plural coded radio frequency commands with the hand-held radio frequency transmitter unit 10 has been described as being capable of learning, responsive to the received radio frequency signal, the additional coded radio frequency command corresponding to the received radio frequency signal. The steps of the described method include modulating the operation of the oscillator using pre-programmed coded commands from the programmable controller 12, coupling the oscillator 26 and receiving signals via the antenna 30, and learning and storing the additional coded commands corresponding to the received coded radio frequency signals. When it is desired that either the pre-programmed or the additional command be transmitted, a step of selecting at least one of the pre-programmed commands or the additional commands for radio transmission is provided for causing the oscillator 26 to be modulated by either of such commands. The described method also includes steps of coupling the memory 24 to the programmable controller 12 and storing the additional coded commands corresponding to the received coded radio frequency signals in the fixed code format in memory 24.

Figure 5:
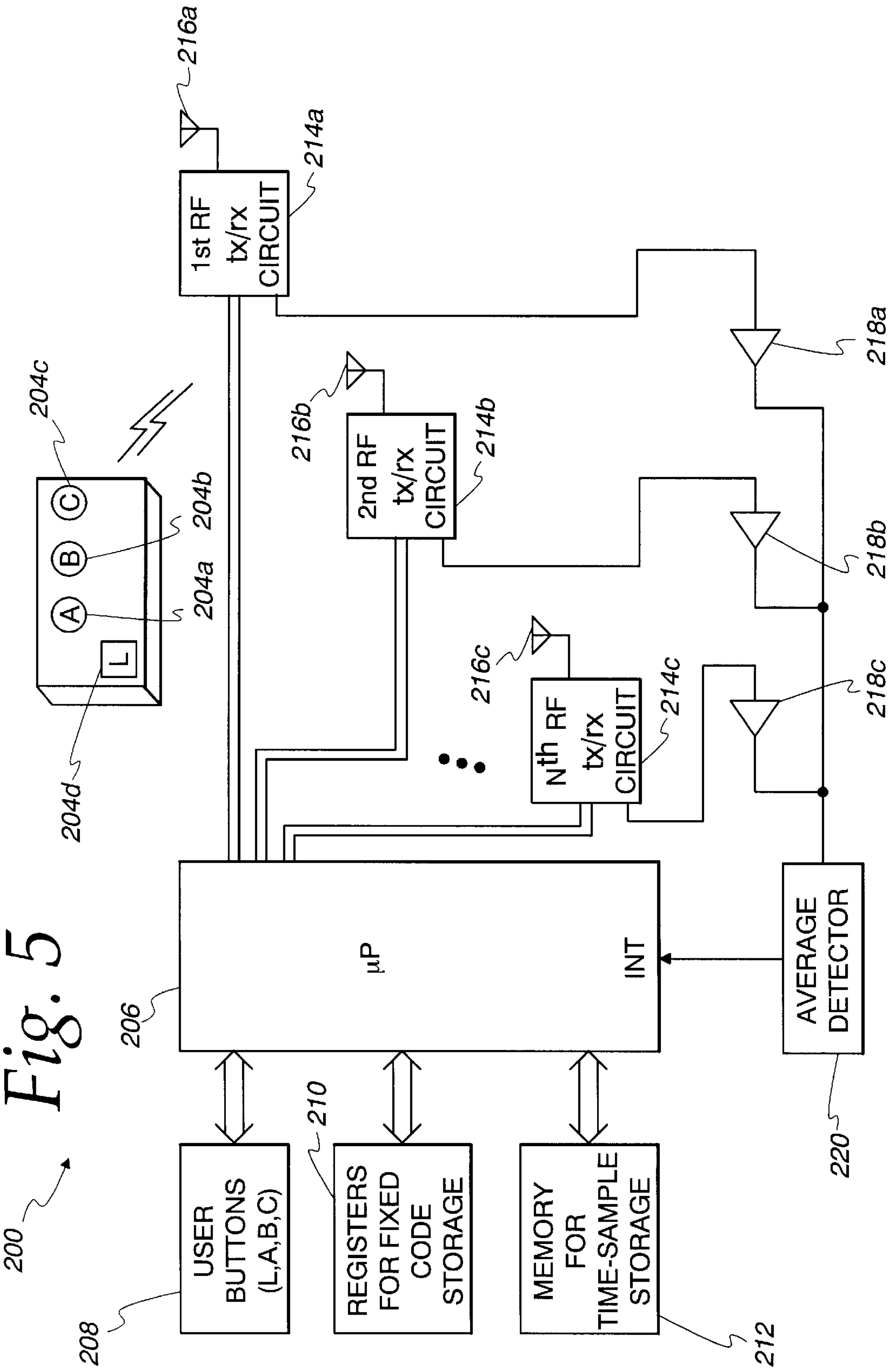
FIG. 5 is a block diagram of a hand-held radio frequency transceiver 200 representing an alternate embodiment in accordance with the present invention.

FIG. 5 is a block diagram of a hand-held radio frequency transceiver 200 which extends the prior system to a trainable transceiver for learning several different code formats of different manufacturer types and transmit frequencies. FIG. 5 shows the learning transceiver, which may be the target transmitter, in communication with an additional learning transceiver shown in block diagram form. One of the trainable transceivers is shown in its housing 202 which includes several buttons, 204*a*, 204*b*, 204*c*, and 204*d* which provide functions of code storage at locations "A", "B", "C", and further the learning function "L." The transceiver 200 includes a microprocessor 206 which provides several input/output ports for connection to, e.g., user input buttons 208 and data registers 210 for fixed code storage. The codes received, stored and learned include codes from Genie-, Chamberlain-, and Stanley-type code formats. Additionally, where time-sample storage of code format data is desired, a memory 212 is provided for use with microprocessor 206 for storage of transmittable data.

A plurality of transceiver circuits are illustrated by reference numerals 214*a*, 214*b*, and 214*c*, which provide "n" different transceiver circuits each tuned to a particular frequency. Each transceiver includes a transmitter as described above in connection with FIG. 1 showing oscillator circuit 26 which provides for tuning the oscillator circuit for transmission via an antenna, or, alternatively, driving a transistor-type switching element into a non-linear mode for detection of a low-level received signal for amplification and then detection by the microprocessor 206. The plurality of antennas, one each being coupled to one of the transceiver circuits 214*a*–214*c*, are provided as antennas 216*a*, 216*b*, and 216*c*, respectively. Accordingly, rather than employing a general purpose wide-band synthesizer of considerable cost for the reception and transmission of differing code formats at various frequencies, the described embodiment employs a plurality of separate transceiver circuits 214*a*–214*c*, with a plurality of separate antennas 216*a*–216*c* which are used to provide a second set of operating frequencies corresponding to those most prevalent in the radio control industry. Individual amplifiers 218*a*, 218*b*, and 218*c* are provided at the output of transceivers 214*a*–214*c* for receiving and amplifying detected signals used for programming of the trainable transceiver 200. The outputs of amplifiers 218*a*–218*c* are fed to average detector 220 which provides a signal output to an interrupt pin (INT) of the microprocessor 206. The interrupt input at the microprocessor 206 is used to receive and identify the ON/OFF signal timing via average detector 220 which provides for accurate timing of the signals. The average detector 220 output is shown connected to an interrupt port of the microprocessor 206 for timing acquisition, however, it could be connected to another microprocessor input port which is polled by the microprocessor for interrupt or polling timing of the input signal. It should also be mentioned that a single wide band receiver as discussed with regard to FIG. 1 may be used to detect the codes received at all of the RF frequencies expected to be received. The trainable transceiver 200 should be considered to comprise a plurality of transmitter circuits, one for each frequency for which transmission is likely, and at least one wide band receiver for receiving codes to be learned.

As is explained below, the trainable transceiver 200 is provided with programming for identifying a number of different code formats from various manufacturers using the indicia of the received code to identify the corresponding frequency of operation associated with a particular manufacturer. The plurality of transceiver output stages for transmission at various output frequencies thus provides several radio frequency oscillator frequencies for a number of different manufacturers. The trainable transceiver 200 thus monitors a wide band of frequencies by scanning through the transceiver sections 214*a*–214*c*. When a code is received on one of the transceiver sections, the transceiver 200 identifies indicia in the code for decoding the signal for storage as either a fixed code in register 210 or for time-sample data storage in the memory 212, thereafter identifying the frequency at which the code should be retransmitted, as discussed below.

Figure 6A:
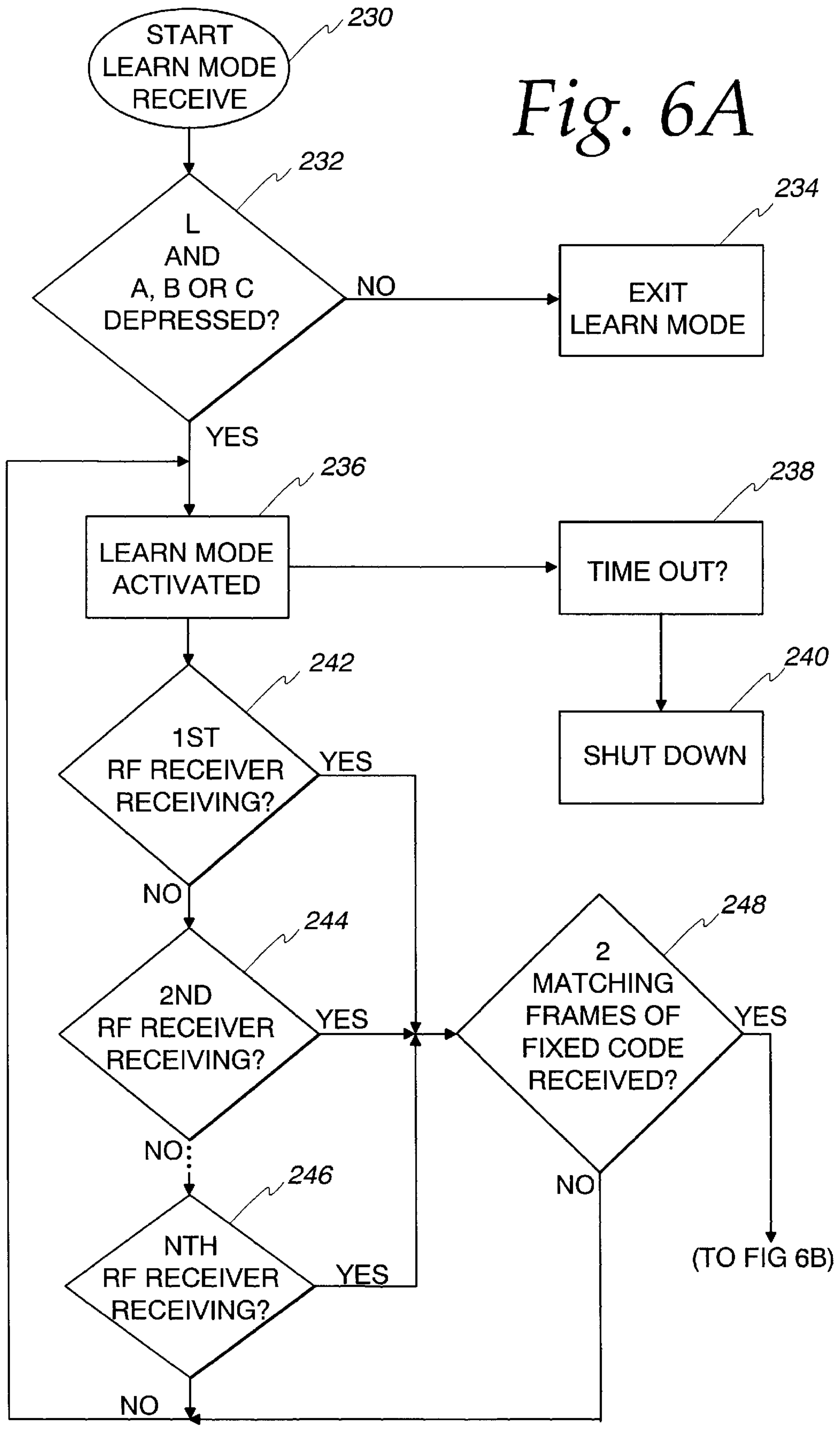
FIGS. 6A, 6B, 6C and 6D are program flow charts showing operations for the microprocessor 206 of the radio frequency transceiver 200 shown in FIG. 5.
Figure 6B:
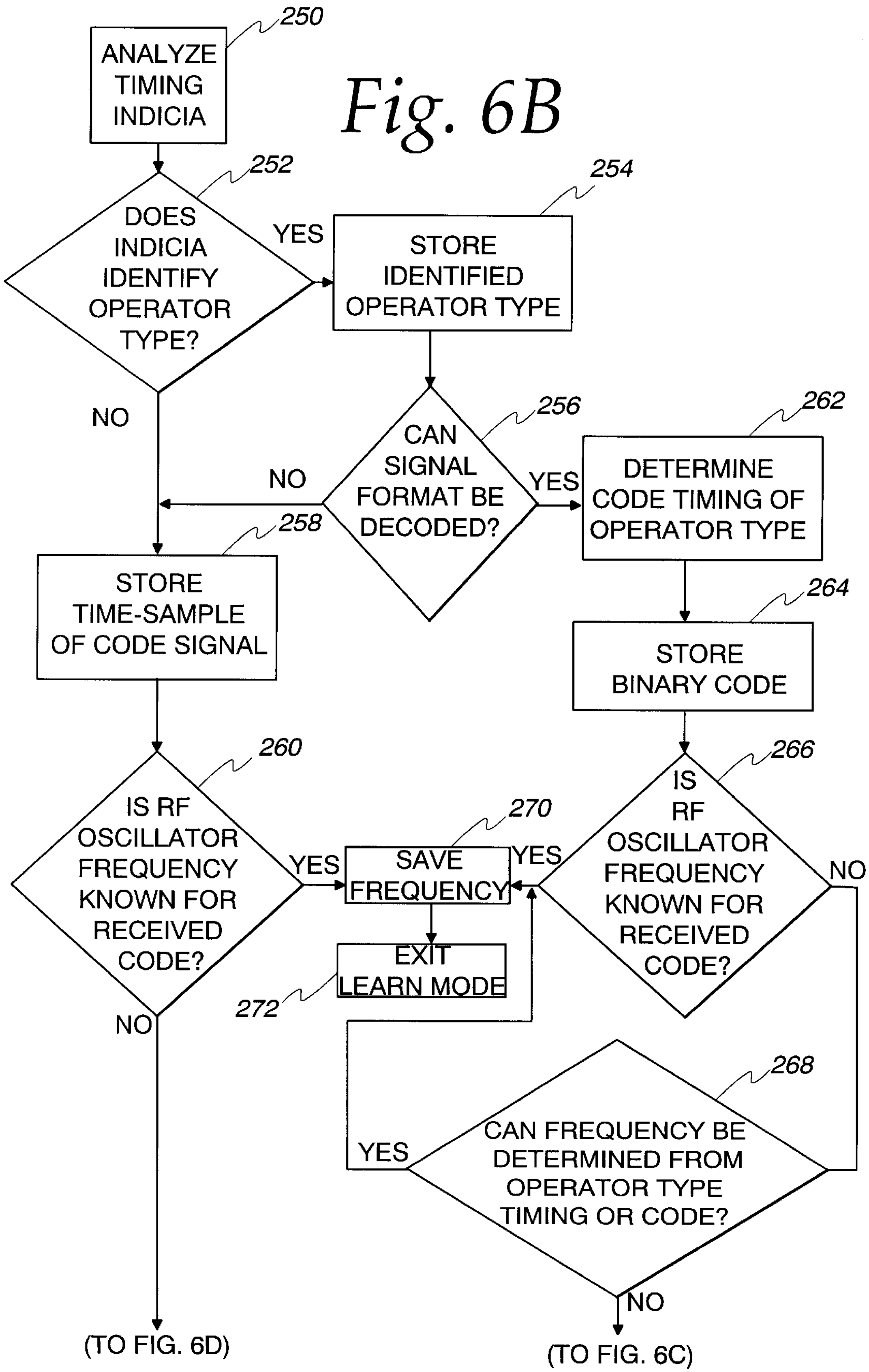

FIG. 6A is a program flow chart for operating the transceiver 200, wherein program flow proceeds to start learn mode receive at 230. Next, decision step 232 identifies whether button "L" and either A, B, or C are depressed simultaneously for indicating an initiation of the learn mode for reception of a code from a target transmitter. An exit from the learn mode is provided at step 234 if the proper combination of buttons are not depressed simultaneously by the user. If, however, the learn mode has been activated, the program proceeds to step 236 where a time out 238 is provided for determining whether a radio frequency code has been received within a pre-determined period of time, the lack of such a signal will initiate a shutdown of the learn mode in transceiver 200 at step 240.

A scan loop is provided for looking for radio frequency codes using receiver sections of the transceivers 214*a*–214*c*. Specifically, a decision using the first RF receiver at step 242 determines whether a code is being received at the first RF receiver. If no code is received on the first RF receiver, the program proceeds with the scanning of remaining radio frequencies by determining whether a code is being received by the second RF receiver at step 244. Likewise, "n" number of receiver stages, e.g., 3 stages, may be employed for determining reception of frequency codes at "n" different frequencies, wherein program flow proceeds to the nth receiver at step 246, and where no code has been received program flow continues back to the learn mode activated step 236 and time out 238 until a code has been received or the time out expires for shutdown of the transceiver 200. It is envisioned, however, that the scanning of received frequencies may be somewhat coarser than that provided for by the oscillator frequencies for the transmissions discussed herein. Whereas, the transceiver may transmit at 310 MHz, 315 MHz and 390 MHz, the receivers need not operate at all such frequencies. E.g, it may be advantageous to attempt reception at the band edges, such as 310 MHz and 390 MHz. Alternatively, it may be sufficient to merely provide a single broadband receiver capable of reception throughout the useable radio frequency spectrum. Upon reception of a code with one of the RF receivers, step 248 determines whether two matching frames of a fixed code have been received. If two matching frames of a fixed code cannot be received at step 248, program flow returns thereafter to the learn mode activated step 236 and time out 238, as discussed above.

Figure 7A:
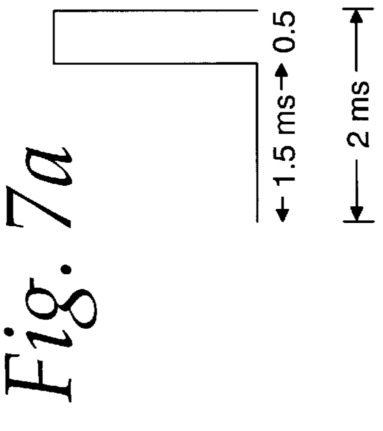
FIGS. 7A, 7B and 7C illustrate the basic Stanley code format, where
Figure 7B:
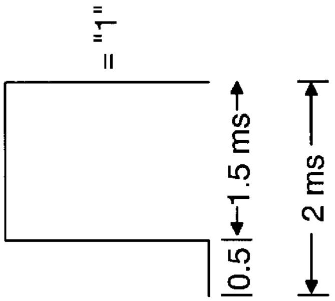

Upon reception of two matching frames of a fixed code, the code is analyzed for its timing indicia at step 250, from which timing it is often possible to determine the manufacturer type or a given code format, as discussed further below. Identification of the manufacturer type reduces the number of likely operating frequencies to one or more pre-determined frequencies for re-transmission of the learned code. For example, the analysis of timing indicia, FIG. 7A and FIG. 7B show respective binary states "0" and "1" bit cycles during a two-millisecond bit coding period. Herein, a "0" is represented at FIG. 7A as 1.5-millisecond low period terminating with a high-period pulse of 0.5 millisecond duration. The alternate binary state, 1, is shown in FIG. 7B, herein a 0.5-millisecond low period followed by a 1.5-millisecond high period. Thus the coding presents a pulse-width modulated ten-bit code corresponding to a ten-bit DIP switch setting on the Stanley-type transmitter unit.

Figure 7C:
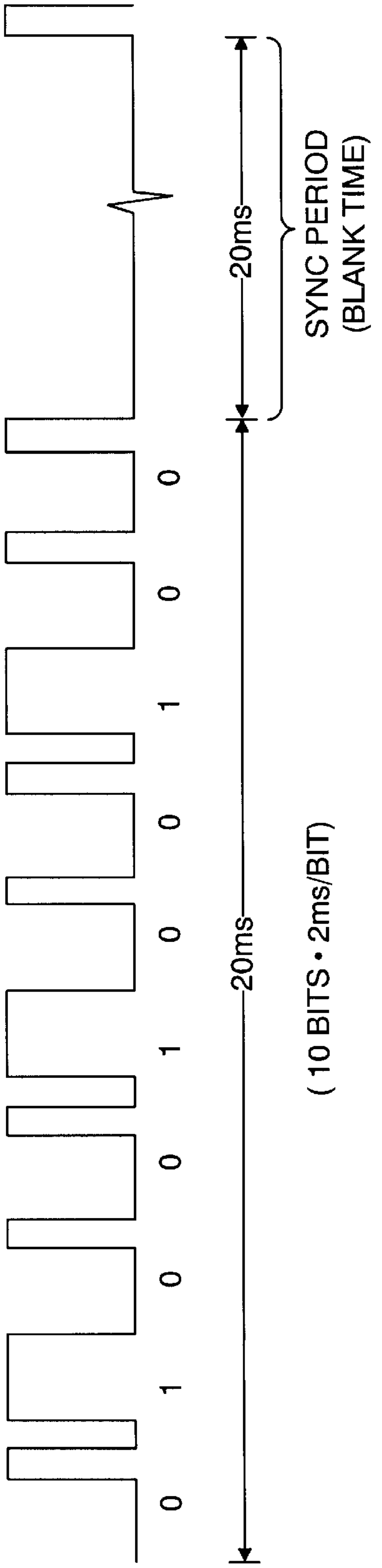

FIG. 7C shows ten two-millisecond bit sections for a total of 20 milliseconds duration for the bit stream 0100100100, followed by a 20-millisecond synchronization period or blank time. The blank time provides the only means for receiver synchronization since a specific synchronization signal is not provided. The Stanley code is thus defined by its period nominally of two milliseconds, which begins at the rising edge of each pulse, such that a 0.5-millisecond pulse indicates the logical "0", and the 1.5-millisecond indicates the logic of the number "1".

Accordingly, the analyze timing indicia step of 250 may be used in analyzing the bit stream of FIG. 7C to identify the stream being exclusively comprised of 0.5-millisecond and 1.5-millisecond pulses, and the blank time of 20 milliseconds to discern that the received code is that of a Stanley-type transmitter. In the case of the received data stream of FIG. 7C, the decision at step 252, "does indicia identify operator type?" will be determined as Stanley and step 254 stores the identified operator type. Alternatively, if the operator type cannot be identified, or if the received radio frequency code is of an unknown format, then step 258 may be used to store a time-sample of the received code signal. The decision to store the received time sample of the code signal at step 258 may also be determined by the transceiver 200 in its inability to ascertain the signal format for decoding as determined at step 256, "can signal format be de-coded?"

Figures 8A, 8B, 8C, 8D, 8E, 8F:
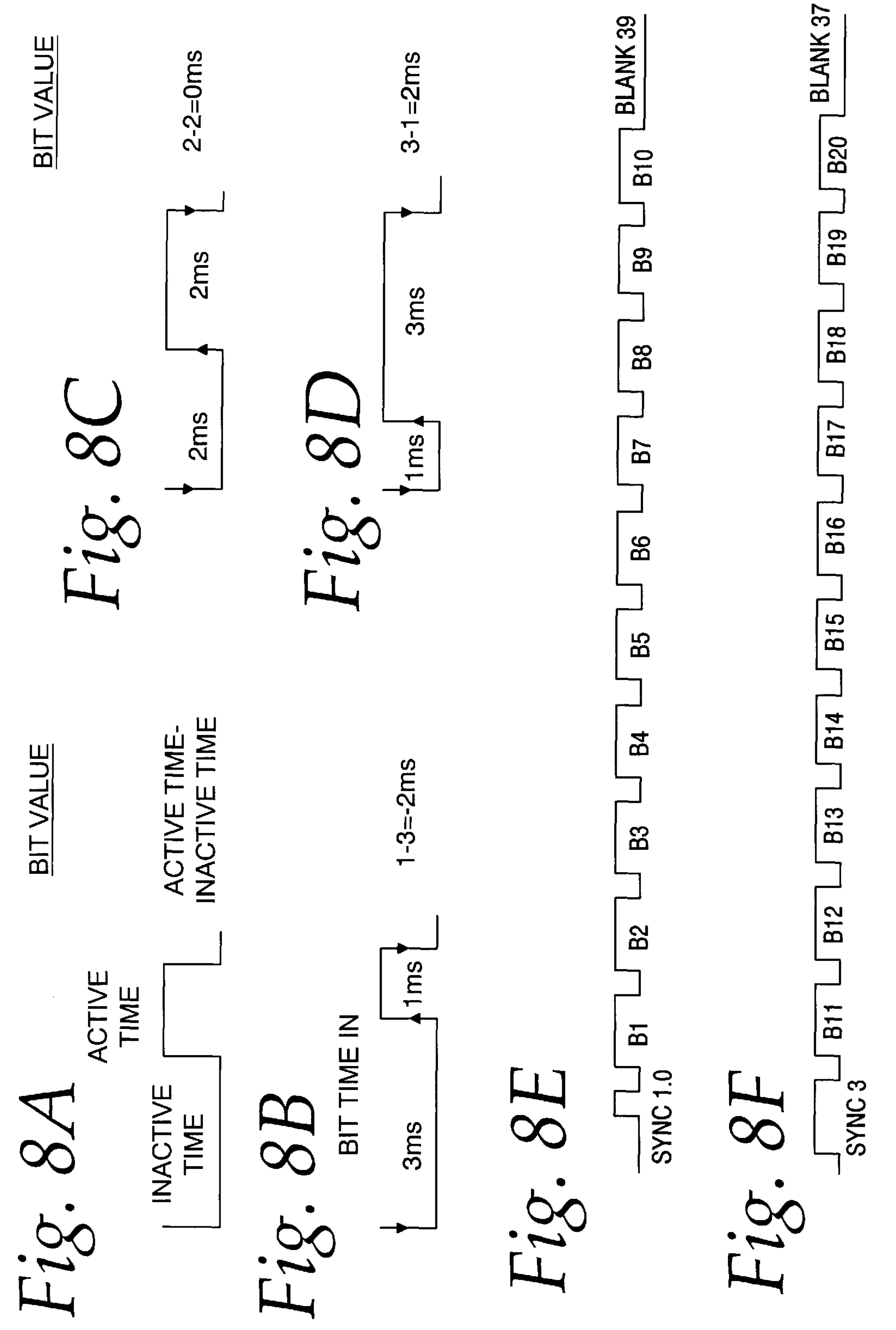
FIGS. 8A, 8B, 8C, 8D, 8E and 8F illustrate the basic Chamberlain code formats, where

The radio frequency code illustrated in FIGS. 8A–8F and FIGS. 9A–9D include data of the Chamberlain and Genie formats, respectively. Herein, FIGS. 8A–8F illustrate basic Chamberlain code formats, where FIG. 8A illustrates the trinary bit pattern generally wherein inactive or low time periods are compared against active or high time periods within a four-millisecond bit time. In FIG. 8B, the bit timing represents, e.g., a code where "−2" wherein the 4 millisecond bit includes an initial 3 millisecond low followed by a 1 millisecond high signal. FIG. 8C representing, e.g., a "0" bit is identified by an initial 2 millisecond low followed by a 2 millisecond high signal. The third bit, e.g., a "2" bit is provided as a 1 millisecond initial low followed by a 3 millisecond high signal. Accordingly, the Chamberlain format includes pulse width modulation wherein the pulse width for three defined trinary codes are 1.0 milliseconds, 2.0 milliseconds, or 3.0 milliseconds in duration. As discussed above, therefore, the pulse width durations may be used at step 250, analyze timing indicia, to ascertain that the received code is of a Chamberlain-type by identifying the presence of one-millisecond pulse width modulated signals. Additionally, the Chamberlain-type code format includes either 10-bit or 20-bit codes, wherein FIG. 8E represents the characteristic 10-bit code bit string, and FIG. 8F represents an additional ten bits which may follow the first ten bits of FIG. 8E. As illustrated, FIG. 8E starts with a high-level synchronization pulse of one bit time followed by ten bits B1–B10 and then a blank period of 39 bit cycles. Ten bit code format would simply follow the timing set forth in the bit stream of FIG. 8E. However, FIG. 8F may follow for a 20-bit code wherein an initial synchronization pulse of three bit times in duration follows with bit B11–B20 which ends with a 37-bit cycle blank.

Figures 9A, 9B, 9C, 9D:
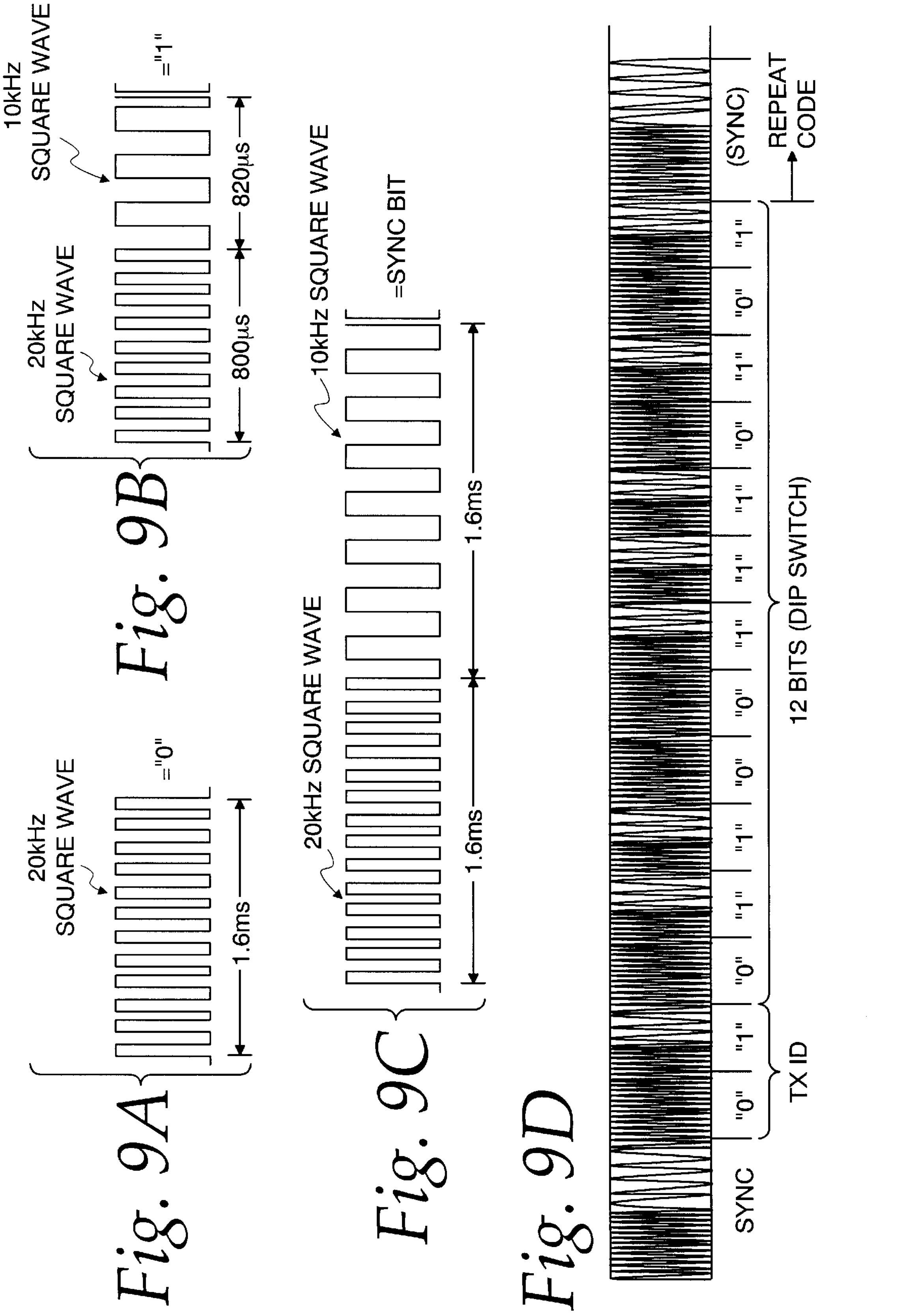
FIGS. 9A, 9B, 9C and 9D illustrate the basic Genie code format, where

Turning now to FIGS. 9A–9D, the basic Genie code format is illustrated, where FIG. 9A and FIG. 9B represent respective binary codings for "0" and "1" bits. Herein, the bit cycles are provided as 1.6 milliseconds in duration through frequency shift keying and a constant 20 kilohertz square wave for 1.6 milliseconds is representative of the "0" bit in FIG. 9A, and frequency shifting between an initial 20 kilohertz square wave for 800 microseconds, followed by 800 microseconds of a 10 kilohertz square wave is representative of a "1" bit in FIG. 9B. The synchronization period in the Genie format, represented by FIG. 9C is two 1.6 millisecond cycles in duration, or 3.2 milliseconds wherein an initial 1.6 milliseconds of a 20 kilohertz square wave is followed by 1.6 milliseconds of a 10 kilohertz square wave. An example of a Genie bit stream is shown in FIG. 9D wherein an initial sync bit is followed by a 2 bit transmitter ID code after which a 12 bit transmitter code follows, which is representative of DIP switch setting. Thereafter, a sync pulse will represent the subsequent transmission of an additional code. Therein, FIG. 9D represents the symbol transmission of a Genie code format of the bits "011001110101".

Thus, the Genie transmission is encoded by a series of square wave pulses which are either high frequency or low frequency including periods of either 50 microseconds or 100 microseconds. The bit cycle timing of the Genie transmitter is approximately 1.6 milliseconds and thus a received radio frequency signal timing indicia indicating of 1.6 milliseconds duration or the 50 and 100 microseconds frequency pulses in the pulse train may be used to determine the identity of a Genie transmitter type code format. Additionally, the sync bit as discussed above is a unique symbol in the typical bit stream. A low frequency pulse train occurs only in a burst of 800 microseconds, whereas the sync bit shown in FIG. 9C includes a high frequency pulse train and a low frequency pulse train, each of 1.6 milliseconds in duration. This unique symbol enables the Genie receiver to recognize the start of a code word.

Accordingly, the analysis of timing indicia at step 250 provides for the review of received radio frequency code transmission for pulse duration, bit time, synchronization or blanking times and the like, for determining the particular code type of predetermined manufacturers. If the manufacturer type can be identified, step 252 proceeds to the step of storing the identified operator type at step 254. At step 256, a decision based upon the stored operator type and timing indicia, the transceiver 200 determines whether the signal format can be decoded and if the signal format can be decoded. The coded signal is stored by its binary code at step 262 but, however, if the code cannot be ascertained, the time sample of the code may be stored at step 258. At step 262 the code timing of the operator type is determined for, e.g. bit time, synchronization times and blanking time periods. At step 262, the binary code is stored in corresponding register for the identified manufacturer type.

Figure 6C:
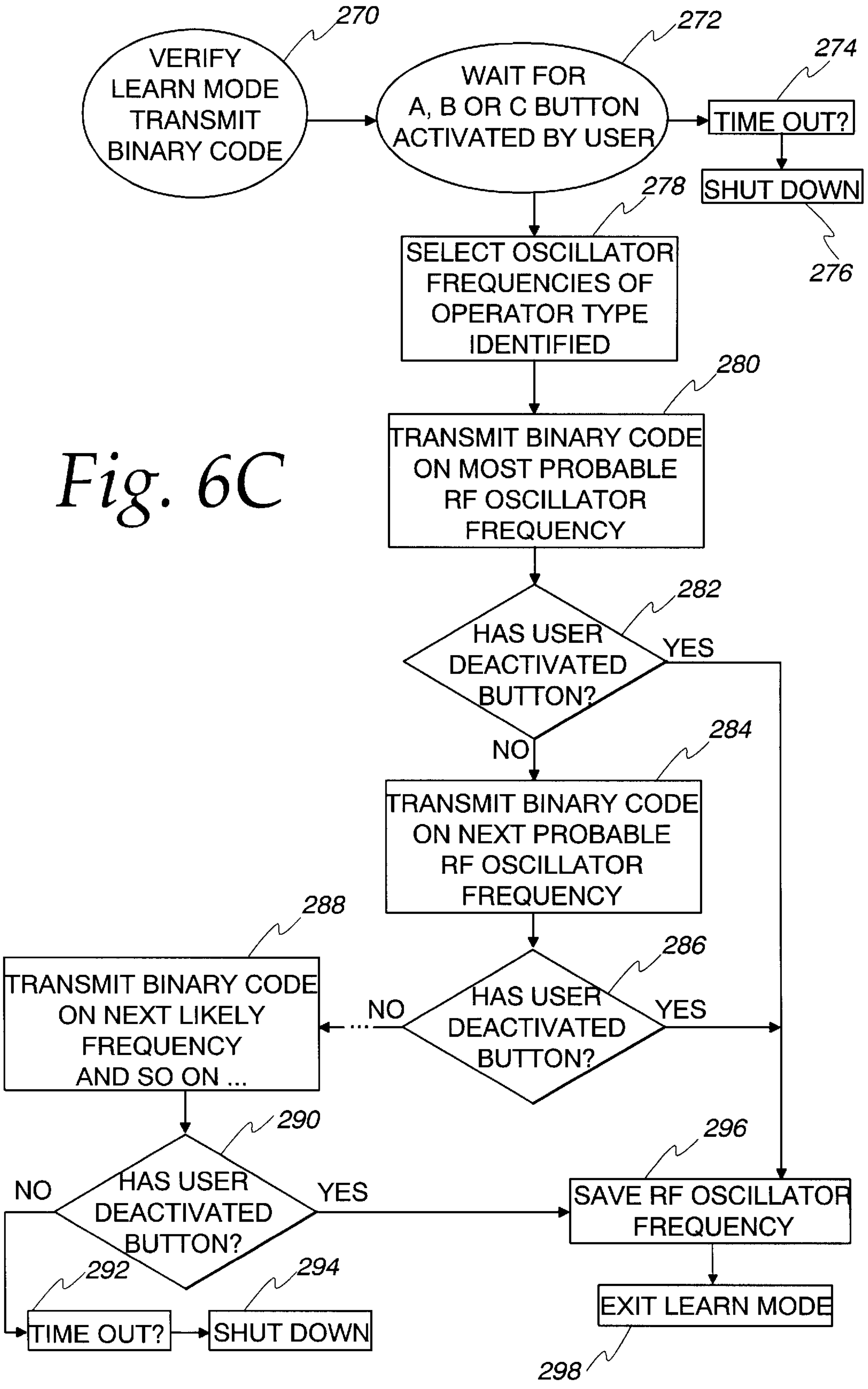

Steps 260 and 266 for the type sample signal and binary code for the radio frequency code format, respectively, are used to determine whether the RF oscillator frequency is known for the received code. If at steps 260 or 266, the RF oscillator frequency for the received code is known, step 270 saves the frequency in memory and the program proceeds to exit the learn mode at step 272. The identified RF oscillator frequency may be known from the indicia indicating the operator type at step 262, the determination of the code timing of the operator type at 262 or from the particular receiver 214_a–c_ from which the code was received. For example, a look-up table may be provided to identify the particular frequencies at which various manufacturer types operate, e.g., Chamberlain codes typically operate most often at 390 MHz or sometimes at 315 MHz, while Stanley, Multicode and Linear usually operate at 315 MHz and sometimes at 310 MHz. Typically, the Genie-manufactured transmitters and receivers will operate at 390 MHz. Accordingly, a frequency/manufacturer look-up table is provided in software for determining whether the RF frequency may be derived from the code format indicia and other criteria.

Where the RF oscillator frequency is unknown for the stored binary code, step 268 is used to determine whether the frequency can be determined from the operator type timing or the code indicia itself, and if such information yields the frequency then the frequency is saved at step 270, as discussed above. If, however, the frequency of the RF oscillator cannot be determined from this additional information for the stored binary code, then program flow proceeds to FIG. 6C where step 270 is used to verify the learn mode transmit binary code wherein an actual transmission of the binary code from the transceiver 200 is used with user interaction to verify the RF oscillator frequency associated with the learned code.

In the verification by transmission of the learned binary code, while in the learn mode step 272 provides for waiting for user initiated A, B or C button activation for new transmission of the learned code. At step 278 a selection of oscillator frequencies of the operator type identified previously is used for selecting likely oscillator frequencies for the retransmission of the code, with the most probable RF oscillator frequency being used at step 280. Thus, where the code is identified as being a Chamberlain-type, then the most probable oscillator frequency for the transmission may be 390 MHz, whereas for a Stanley-type, the most probable may be 315 MHz. In waiting for the user to activate one of the A, B or C buttons, a time out 274 is provided for a period of time during which the transceiver 200 will wait in the learn mode, after which time at step 276 the transceiver 200 is shut down.

Upon transmission of the binary code on the most probable oscillator frequency for a particular identified manufacturer at step 280, step 282 then is used to ascertain whether the user has deactivated the button A, B or C previously activated by the user, which provides user indication of acknowledging that the most probable RF oscillator frequency employed in the retransmission is actually the correct frequency for operation of the garage door operator receiver or other radio controlled device. If the user has not deactivated the button at step 282, then program flow proceeds to step 284 where the next most probable RF oscillator frequency is used in transmitting the binary code, upon which step 286 determines whether the user has yet deactivated the button in acknowledgement of the correct operation of the learned code. Thus, where the code is identified as being a Chamberlain-type, then the next most probable oscillator frequency for the transmission may be 315 MHz, whereas for a Stanley-type, the next most probable may be 310 MHz.

If the user has not yet released the activated button, program flow will proceed to the next likely frequency and so on at step 288 where the code retransmission occurs with the next most likely RF oscillator frequency at which point step 290 is used to determine whether the user has now deactivated the button upon correct operation of the learned code with the transceiver 200. After a time out period at 292, however, if the user has not yet deactivated the button indicating the learned code has not been used to satisfactorily operate the remote equipment, then a shutdown of the transceiver 200 will occur at step 294. After an attempted learning of a target transmitter has failed through timeout at step 292 and shutdown at step 294, the user will likely be instructed in the programming method to attempt again to use the target transmitter in training the trainable transceiver 200 to learn the code the target transmitter. If, however, the user deactivates the button within the designated time frames of steps 282, 286 or 290, then the RF oscillator frequency has been identified and step 296 is used to save the RF oscillator frequency, after which an exit from the learn mode is provided at step 298.

Figure 6D:
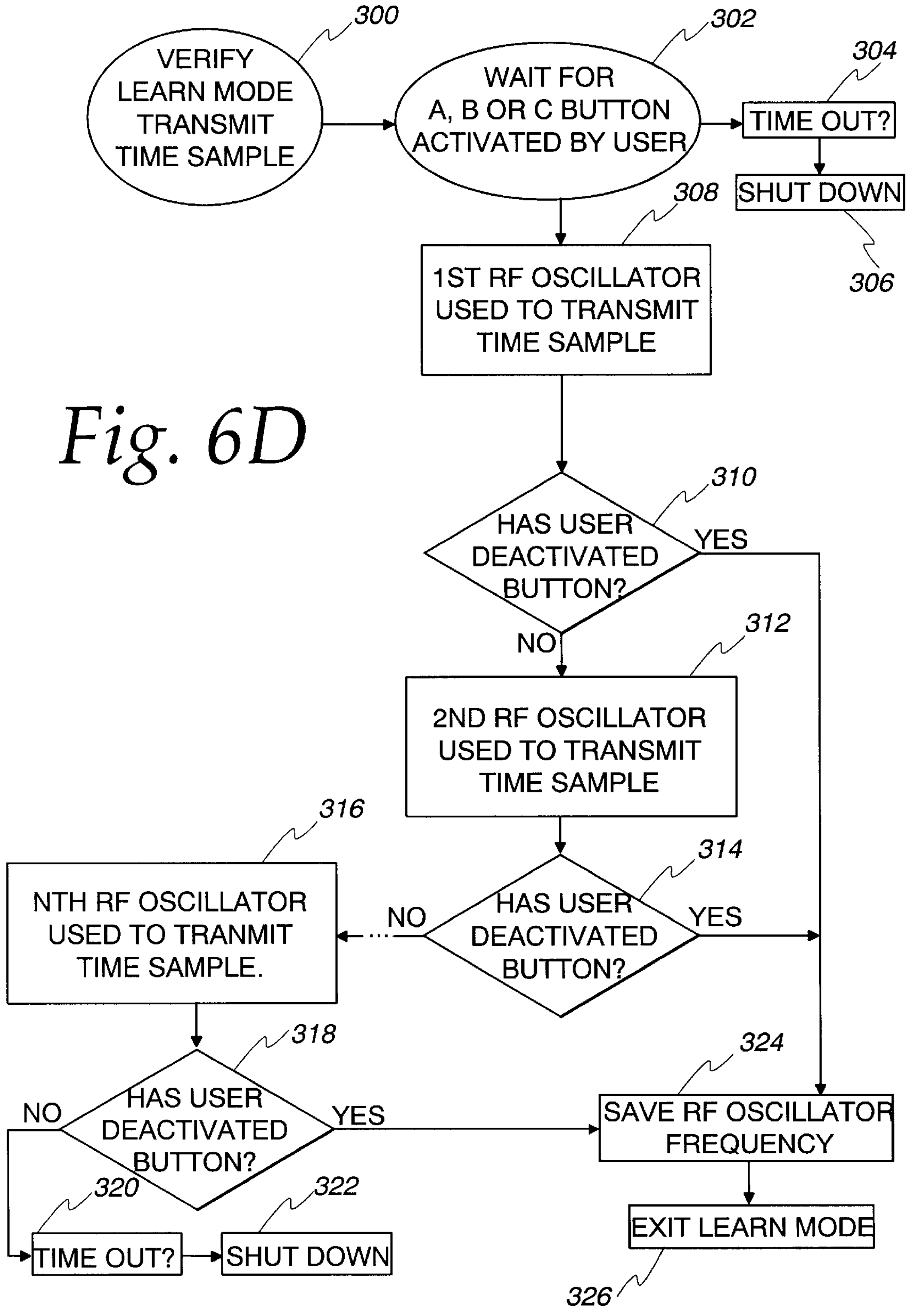

In the case where the stored time-sample of the coded signal is unknown, then the oscillator frequency for the transmitter is determined through the program flow set forth in FIG. 6D. Turning now to FIG. 6D, a verification of a learn mode transmit for time sample data is initiated at step 300, after which a step 302 provides for waiting for activation of button A, B or C by the user, the timeout 304 being employed for shutting down the transceiver 200 at step 306 if easier activation of the one of the buttons is not initiated within a predetermined time period for retransmission in order to verify the stored time sample. At step 308 the first RF oscillator, e.g., 390 MHz, is used to transmit the stored time sample upon which a decision at step 310 provides a determination of correct selection of the RF oscillator by the user deactivation of the button within a predetermined time after the retransmission of the first RF oscillator. If, however, the user has not deactivated the button at step 310 then, a retransmission using the second RF oscillator frequency, e.g., 315 MHz, is used to transmit the time sample at step 312. Step 314 then determines whether upon transmission of the second RF oscillator frequency, the user has deactivated the button in acknowledgement of the correct transmission of the radio frequency signal for operation of the remote equipment or device where program flow will proceed as long as the user has not deactivated the button to the "nth" RF oscillator, e.g., 310 MHz, used to retransmit the time sample at step 316, upon which step 318 determines whether the user has yet deactivated the button. If, however, the user keeps the button depressed in the verify learn mode transmit time sample, the timeout will eventually occur at step 320 upon which the transceiver 200 will be shut down at step 322. If the user deactivates the button during the course of retransmission of the correct RF oscillator frequencies at any of steps 310, 314 or 318, then step 324 is used to save the RF oscillator frequency and an exit from the learn mode is provided at step 326.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A radio frequency transmitter unit for generating commands learned from received coded radio frequency signals, comprising:

a plurality of transceiver circuits;

a plurality of antennas, one each being coupled to one of said transceiver circuits;

a programmable controller coupled to each of said plural transceiver circuits for selectively operating at least one of said transceiver circuits in a first mode of operation for demodulating received coded radio frequency signals from the antenna coupled thereto, the at least one transceiver circuit being operated as a wide-band receiver:

a memory device connected to said programmable controller, said programmable controller being responsive to the demodulated signals for storing received signals in said memory device;

a user interface with said programmable controller for selectively operating at least one of said transceiver circuits in a second mode of operation for modulating operation of selected transceiver circuits to cause the transceiver circuit to be modulated with signals generated by the programmable controller from said memory device; and said antenna being operable with the transceiver circuit for radio frequency transmission of the signals generated by the programmable controller from said memory in said second mode of operation, upon which said user interface facilitates user interaction to verify the radio frequency transmission.

2. A radio frequency transmitter unit as recited in claim 1, wherein each of said plurality of transceiver circuits comprise resonant circuits operable with one of said antennas for receiving and transmitting coded radio frequency transmissions according to the respective first and second modes of operation.

3. A radio frequency transmitter unit as recited in claim 1, wherein the demodulated received coded radio frequency signals may be determined as being in a fixed code format using said programmable controller, the determined fixed code identified therefrom being stored as coded commands from said memory device.

4. A radio frequency transmitter unit as recited in claim 3, wherein at least one fixed code identified is stored in a register for fixed code storage.

5. A radio frequency transmitter unit as recited in claim 1, wherein the demodulated received coded radio frequency signals are obtained as time-sample data sets using said programmable controller, the time sample being stored in said memory device.

6. A radio frequency transmitter unit as recited in claim 1, wherein said received coded radio frequency signals comprise radio frequency signals generated as coded commands from another of said transmitter units.

7. A radio frequency transmitter unit as recited in claim 1, wherein said user interface comprises an input port and input controls comprising a plurality of user selectable buttons coupled to said input port for initiating the learn mode.

8. A radio frequency transmitter unit as recited in claim 7, wherein said plurality of user selectable buttons coupled to said input port of said programmable controller are used individually as being responsive to the demodulated received coded signals for storage and retrieval of plural received coded radio frequency signals in individual locations of said memory device.

9. A radio frequency transmitter in accordance with claim 7 wherein said user interface facilitates identifying user confirmation of the determined one of a plurality of transceiver circuits comprises user activated operation of the transmitter unit for transmission of the learned radio frequency signal command, and user verification by de-activating the operation of the transmitter unit from transmission of the learned radio frequency signal command.

10. A method of programming a radio frequency transmitter unit capable of learning radio frequency commands corresponding to a received radio frequency signal and capable of generating commands learned from the received radio frequency signals, comprising the steps of:

coupling one of a plurality of transceiver circuits to one of a plurality of antennas;

receiving coded radio frequency signals via the coupled antenna using a programmable controller operable with the one of the plurality of transceiver circuits operated as a wide-band receiver;

learning the received radio frequency signal command by storing representative information in a memory device associated with the programmable controller;

analyzing indicia of the received radio frequency signal representative information to determine which of the plurality of transceiver circuits should be employed for radio frequency transmission from the transmitter unit;

selecting a learned radio frequency signal command for transmission from the transmitter unit using determined ones of the plurality of transceiver circuits;

modulating the operation of the determined one of the plurality of transceiver circuits for generating a radio frequency transmission; and identifying user confirmation of the determined one of a plurality of transceiver circuits facilitating user interaction to verify the radio frequency transmission.

11. A method of programming a radio frequency transmitter unit as recited in claim 10 wherein said received coded radio frequency signals are radio frequency signals generated as coded commands from another of said transmitter units.

12. A method of programming a radio frequency transmitter unit as recited in claim 10, wherein said step of identifying user confirmation of the determined one of a plurality of transceiver circuits comprises user activated operation of the transmitter unit for transmission of the learned radio frequency signal command.

13. A method of programming a radio frequency transmitter unit as recited in claim 12, wherein said step of identifying user confirmation of the determined one of a plurality of transceiver circuits comprises the user providing verification by de-activating the operation of the transmitter unit from transmission of the learned radio frequency signal command.

14. A method of programming a radio frequency transmitter unit capable of learning radio frequency commands corresponding to a received radio frequency signal and capable of generating commands learned from the received radio frequency signals, comprising the steps of:

coupling one of a plurality of transceiver circuits to one of a plurality of antennas;

receiving coded radio frequency signals via the coupled antenna using a programmable controller operable with the one of the plurality of transceiver circuits operated as a wide-band receiver;

learning the received radio frequency signal command by storing representative information in a memory device associated with the programmable controller;

analyzing indicia of the received radio frequency signal representative information to determine which of the plurality of transceiver circuits should be employed for radio frequency transmission from the transmitter unit;

selecting a learned radio frequency signal command for transmission from the transmitter unit using determined ones of the plurality of transceiver circuits;

modulating the operation of the determined one of the plurality of transceiver circuits for generating a radio frequency transmission; and identifying user confirmation of the determined one of a plurality of transceiver circuits facilitating user interaction to verify the radio frequency transmission.

15. A method of programming a radio frequency transmitter unit as recited in claim 14, wherein said received coded radio frequency signals are radio frequency signals generated as coded commands from another of said transmitter units.

16. A radio frequency transmitter for transmitting commands learned from received radio frequency signals, comprising:

a plurality of transmitter circuits each for transmitting at a different radio frequency;

at least one wide-band receiver circuit for receiving signals;

means operative in a learn mode for receiving coded signals transmitted at a first radio frequency in an unknown format and for identifying the format of the received coded signals;

means for detecting the code conveyed by the received signals and for determining the detected code from the identified format;

means for selecting a learned radio frequency signal command for transmission from the transmitter unit using determined ones of the plurality of transceiver circuits;

means for modulating the operation of the determined one of the plurality of transceiver circuits for generating a radio frequency transmission; and means for identifying user confirmation of the determined one of a plurality of transceiver circuits facilitating user interaction to verify the radio frequency transmission.

17. A radio frequency transmitter in accordance with claim 16 wherein said means for identifying user confirmation of the determined one of a plurality of transceiver circuits comprises user activated operation of the transmitter unit for transmission of the learned radio frequency signal command.

18. A radio frequency transmitter in accordance with claim 17 wherein said means for identifying user confirmation of the determined one of a plurality of transceiver circuits comprises the user providing verification by de-activating the operation of the transmitter unit from transmission of the learned radio frequency signal command.

19. A radio frequency transmitter in accordance with claim comprising:

switch means for signaling a desire to transmit the stored detected code; and means responsive to the switch means for enabling one of the transmitter circuits identified by the stored identity of radio frequency signals.

20. A radio frequency transmitter in accordance with claim 19 comprising means for coupling the stored detected code to the enabled transmitter circuit for transmission thereby.

* * * * *